Feb. 7, 1961 H. ZUCKER 2,971,049
SYNCHRONOUS DEMODULATOR FOR COLOR RECEIVERS
Filed Oct. 5, 1956
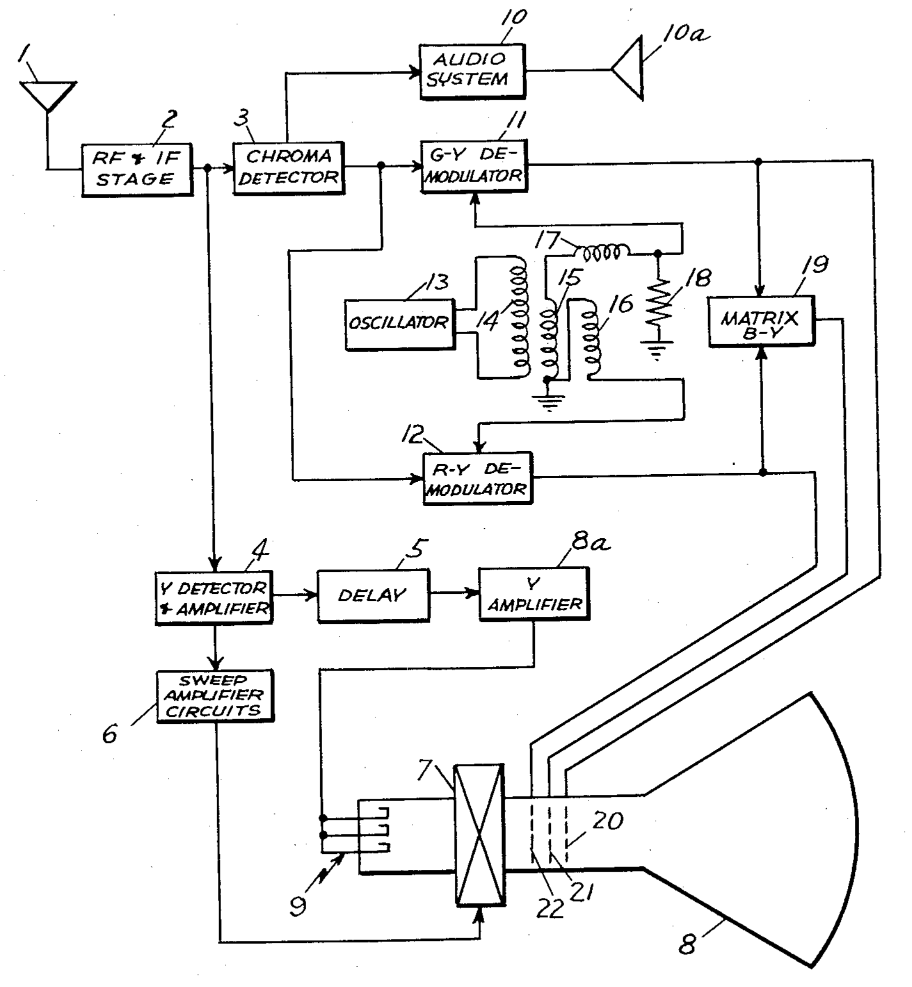
INVENTOR
HENRY ZUCKER
BY Elmer J. Gorn
ATTORNEY 2,971,049

SYNCHRONOUS DEMODULATOR FOR COLOR RECEIVERS

Henry Zucker, Chicago, Ill., assignor to Raytheon Company, a corporation of Delaware Filed Oct. 5, 1956, Ser. No. 614,193

6 Claims. (Cl. 178—5.4)

This invention relates to a demodulation system and more specifically to a demodulation system for obtaining a predetermined phase shift between voltage signals for demodulating the color signals in a color television receiver.

In this invention there is disclosed a phase-shifting network comprising a bifilar transformer that consists of a first coil and a second coil having substantially unity coupling therebetween. One end of said first coil is connected to one end of said second coil, thereby creating a series circuit between said first and second coils. A primary coil is coupled to said bifilar transformer for inducing substantially equal voltages into said first and second coils. One end of said first coil is, in turn, connected to a frequency-responsive element, such as an inductance, of predetermined value sufficient to cause a predetermined phase shift at the frequency of the applied voltage. With this combination, a signal fed to said primary coil will produce at the output of said frequency-responsive element and said second coil signals of predetermined phase shift. This circuit is particularly adaptable to a color television receiver utilizing a G—Y demodulator and a R—Y demodulator.

Further objects and advantages of this invention will be made more apparent as the description progresses. Reference will now be made to the accompanying drawing where there is shown a block diagram of a television receiver incorporating a phase-shifting network built in accordance with the teachings of this invention. The color television receiver to be described is basically the NTSC system, which is more fully described in an article entitled, "Principles of NTSC Compatible Television," page 88 of Electronics Magazine published by McGraw-Hill Publications in the February 1952 edition. In this type of color television system it is usual to produce color difference signals each containing different color information. Two independent signals, each representing color difference information, are usually modulated on two subcarrier components having the same frequencies but in phase quadrature with each other. These two independent signals, which contain all the color information, are detected in the color television receiver where they are then combined with the black and white or luminance signals.

The composite signals containing the luminance and color signals are received by antenna 1 which feeds a conventional RF and IF stage 2. Stage 2 usually contains a tuner followed by a video IF system that is somewhat more extensive than the video IF system used in black and white sets in that more stages having a larger band pass are used. The output of stage 2 feeds both a chroma detector 3 and a Y detector and amplifier 4. The output of stage 4 consists of the Y or luminance video signal which is fed to a delay stage 5 and the necessary sync information which is fed to a sweep amplifier circuit 6. The output of stage 6 is fed to deflection coils 7 which are located on a conventional tri-color picture tube 8. Delay stage 5 is necessary to slow down the luminance signals since the band width of the Y or luminance signal is so much greater than the band width of the color component signals in view of the fact that a narrow band-width signal is delayed more when passing through an amplifier than a wider band-width signal. The delayed signal from said stage 5 feeds a Y amplifier 8*a*, which, in turn, is connected to the cathodes 9 of tricolor picture tube 8. It will be observed that picture tube 8 is being used as the color matrix, which is conventional in the color matrix art as practiced today.

Detection in a color receiver is presently a two-stage process where first the luminance or Y signal is removed, and second, the color subcarriers are removed in order to make the color video frequencies available. The chroma detector 3 is the second of the two detectors and it delivers the output signals, one of which is the conventional intercarrier for the IF signal, which is fed to audio system 10 and then to speaker 10*a*. The second output signal of chroma detector 3 is fed to both a G—Y demodulator 11 and a R—Y demodulator 12. The chroma detector also supplies the color-burst signal which has not been illustrated. Oscillator 13 generates a 3.85 megacycle signal which is coupled to a primary coil 14. Primary coil 14 is, in turn, coupled to a bifilar transformer, consisting of a first coil 15 and a second coil 16, which coils are connected in series. One end of coil 16 is connected to R—Y demodulator 12. The other end of coil 15 is connected to a delaying network, consisting of coil 17 and resistor 18, which, in turn, is fed to G—Y demodulator 11. Since a G—Y demodulator, is employed in place of the usual B—Y demodulator as used in many previous color receivers, it is necessary that a phase difference of 146° be obtained between the G—Y and R—Y demodulating signals. It can be seen therefore that a voltage applied to primary coil 14 will produce two 180° out-of-phase voltages, one across coil 15, and the second across coil 16. The additional 34° phase shift, which is necessary to obtain a total phase shift between the two voltages of 146°, may therefore be obtained from any frequency-responsive element such as coil 17 and resistor 18. It was observed that resistor 18, having a value of approximately 1000 ohms, and coil 17, having a value of approximately 10 to 20 microhenries, produced a loss of less than 3 db. Having obtained the R—Y and the G—Y signals from demodulators 11 and 12, it is necessary to feed a portion of each of said signals to a B—Y matrix 19 in order to obtain the corresponding B—Y signal. The G—Y signal is then fed to grid 20 of color tube 8, and in a similar manner, the B—Y signal is connected to grid 21 and and the R—Y signal is connected to grid 22, all grids located in color tube 8. A bifilar transformer as used in this specification and claims refers to a transformer having substantially unity coupling between a first winding and a second winding.

This completes the description of the invention illustrated herein. However, many modifications and advantages thereof will be apparent to persons skilled in the art without departing from the spirit and scope of this invention. For example, this particular system of obtaining a predetermined phase shift is not limited to any particular form of television system, but rather to any system where an accurate predetermined phase shift is necessary in order to guarantee operation of the system. Accordingly, it is desired that this invention not be limited to the particular details of the embodiment described herein, except as defined by the appended claims.

What is claimed is:

1. A phase-shifting network comprising a bifilar transformer consisting of a first coil and a second coil connected to provide unity coupling therebetween, one end of said first coil connected to one end of said second coil, a frequency-responsive phase shifting element including resistive and reactive elements connected in series to one end of said first coil, a primary coil coupled to said bifilar transformer, means for generating and feeding a signal to said primary coil thereby producing signals of equal magnitude and predetermined phase at said frequency-responsive phase shifting element and said second coils.

2. A phase-shifting network comprising a bifilar transformer consisting of a first coil and a second coil connected to provide unity coupling therebetween, one end of said first coil connected to one end of said second coil, a frequency responsive phase-shifting element including resistive and reactive elements connected to each other and connected to one end of said first coil, a primary coil coupled to said bifilar transformer, and means for generating and feeding a signal to said primary coil thereby producing signals of predetermined phase shift between said frequency responsive phase-shifting element and said second coil.

3. A phase-shifting network comprising a bifilar transformer consisting of a first coil and a second coil connected to provide unity coupling therebetween, one end of said first coil connected to one end of said second coil, a frequency-responsive phase shifting element including inductive and resistive elements connected to each other and to one end of said first coil, a primary coil coupled substantially equally to both said first coil and said second coil of said bifilar transformer, and means for generating and feeding a signal to said primary coil thereby producing signals of equal magnitude and predetermined phase shift at the output of said frequency-responsive phase shifting element and said second coil.

4. A phase-shifting network comprising a bifilar transformer consisting of a first and a second coil connected to provide unity coupling therebetween, one end of said first coil connected to one end of said second coil, a frequency responsive phase-shifting element comprising an inductance and a resistor serially connected to one end of said first coil, a primary coil coupled to said bifilar transformer, and means for generating and feeding a signal to said primary coil thereby producing signals of predetermined phase shift between said frequency responsive phase-shifting element and said second coil.

5. A color television receiver comprising means for receiving a composite signal, means for producing both a luminance signal and color component signals from said composite signal, means for demodulating each of said color component signals by means of a phase-shifting network comprising a bifilar transformer consisting of a first coil and a second coil, one end of said first coil connected to one end of said second coil, a frequency responsive phase-shifting element connected to one end of said first coil, a primary coil coupled to said bifilar transformer, means for generating and feeding a signal to said primary coil thereby producing signals of predetermined phase shift between said frequency responsive phase-shifting element and said second coil, said second coil coupled to a first demodulator and said frequency responsive phase-shifting element coupled to a second demodulator for producing a first and second color signal, means for producing a third color signal from said first and second color signals, and means for feeding said color signals and said luminance signal to a color tube in the proper phase and amplitude relationship with each other for reproducing said received composite signal.

6. A color television receiver comprising means for receiving a composite signal, means for producing both a luminance signal and color component signals from said composite signal, means for demodulating each of said color component signals by means of a phase-shifting network comprising a bifilar transformer consisting of a first coil and a second coil, one end of said first coil connected to one end of said second coil, a frequency responsive phase-shifting element comprising an inductance and a resistor coupled to one end of said first coil, a primary coil coupled substantially equally to both said first coil and said second coil of said bifilar transformer, means for generating and feeding a signal to said primary coil thereby producing signals of predetermined phase shift between said frequency responsive phase-shifting element and said second coil, said frequency responsive element phase-shifting connected to a first color demodulator and said second coil connected to a second color demodulator for producing a first and second color signal, means for producing a third color signal from said first and second color signals, and means for feeding said color signals and said luminance signals to a color tube in the proper phase and amplitude relationship with each other for reproducing said received composite signal.

References Cited in the file of this patent

UNITED STATES PATENTS 2,599,182 Kerns ------------------ June 3, 1952

FOREIGN PATENTS 635,526 Great Britain ----------- Apr. 12, 1950

OTHER REFERENCES

Rider's Television Manual, vol. 18, copyrighted June 10, 1956.

Emerson TV, page 18–30.

Emerson Chassis 120280–A.

Raytheon TV page 18–3.

RCA 21–CD–7895, Chassis #CTC5N, Jfg. #274, 1956, #T6; first printing July 5, 1956.